United States Patent
Yan et al.

(10) Patent No.: US 11,490,164 B2
(45) Date of Patent: Nov. 1, 2022

(54) METHOD AND ELECTRONIC DEVICE FOR DISPLAYING VIDEO

(71) Applicant: BEIJING DAJIA INTERNET INFORMATION TECHNOLOGY CO., LTD., Beijing (CN)

(72) Inventors: Bingwu Yan, Beijing (CN); Shaopeng Han, Beijing (CN); Lijuan Bai, Beijing (CN); Yong Yuan, Beijing (CN)

(73) Assignee: Beijing Dajia Internet Information Technology Co., LTD, Beijing (CN)

( * ) Notice: Subject to any disclaimer, the term of this patent is extended or adjusted under 35 U.S.C. 154(b) by 0 days.

(21) Appl. No.: 17/394,495

(22) Filed: Aug. 5, 2021

(65) Prior Publication Data
US 2022/0210511 A1 Jun. 30, 2022

(30) Foreign Application Priority Data
Dec. 29, 2020 (CN) .......................... 202011589037.4

(51) Int. Cl.
*H04N 21/4728* (2011.01)
*H04N 21/482* (2011.01)

(52) U.S. Cl.
CPC ....... *H04N 21/4728* (2013.01); *H04N 21/482* (2013.01)

(58) Field of Classification Search
None
See application file for complete search history.

(56) References Cited

U.S. PATENT DOCUMENTS 5,844,620 A * 12/1998 Coleman .......... H04N 21/42692
725/54
6,177,931 B1 * 1/2001 Alexander ....... H04N 21/44222
725/52

(Continued)

FOREIGN PATENT DOCUMENTS

CN 102270093 A 12/2011
CN 104301596 A 1/2015

(Continued)

OTHER PUBLICATIONS

European Patent Office, Search Report for EP application 21190025.3, dated Apr. 2, 2022.

(Continued)

*Primary Examiner* — An Son P Huynh
(74) *Attorney, Agent, or Firm* — Timothy W. Menasco, Esq.; Harter Secrest & Emery LLP (57) ABSTRACT

The disclosure can provide a method, an electronic device and a storage medium for displaying a video. The method includes: displaying a first video through a first video region in a display interface; obtaining display parameters of a comment region in response to an operation of triggering to display comments on the first video; zooming out the first video region to a second video region based on the display parameters of the comment region, such that the comment region is displayed in a region outside the second video region in the display interface; and displaying a second video through the second video region; in which the second video is obtained by zooming out the first video; video images in the second video includes key content of video images in the first video.

19 Claims, 7 Drawing Sheets

(56) References Cited

U.S. PATENT DOCUMENTS

| | | | | |
|---|---|---|---|---|
| 6,442,755 | B1* | 8/2002 | Lemmons | H04N 21/8543 |
| | | | | 725/47 |
| 7,143,428 | B1* | 11/2006 | Bruck | H04N 21/4316 |
| | | | | 725/37 |
| 9,154,813 | B2* | 10/2015 | Gilson | H04N 5/445 |
| 9,842,268 | B1* | 12/2017 | Krafka | G06T 7/11 |
| 9,992,553 | B2* | 6/2018 | Bennett | H04N 21/25833 |
| 10,063,911 | B1* | 8/2018 | Obara | H04N 21/44218 |
| 10,123,073 | B2* | 11/2018 | Cremer | H04N 21/44016 |
| 10,440,436 | B1* | 10/2019 | Taylor | H04N 21/234345 |
| 10,517,504 | B2* | 12/2019 | Claude | G06K 9/34 |
| 11,134,301 | B2* | 9/2021 | Gentile | G06F 13/22 |
| 2001/0001160 | A1* | 5/2001 | Shoff | H04N 5/44543 |
| | | | | 725/51 |
| 2002/0144262 | A1* | 10/2002 | Plotnick | H04N 21/252 |
| | | | | 725/32 |
| 2004/0107439 | A1* | 6/2004 | Hassell | H04N 21/4312 |
| | | | | 725/44 |
| 2005/0262542 | A1* | 11/2005 | DeWeese | H04N 21/4751 |
| | | | | 725/106 |
| 2006/0187358 | A1* | 8/2006 | Lienhart | H04N 21/812 |
| | | | | 348/661 |
| 2009/0228922 | A1* | 9/2009 | Haj-khalil | H04N 21/42204 |
| | | | | 725/38 |
| 2010/0302281 | A1 | 12/2010 | Kim | |
| 2011/0216201 | A1 | 9/2011 | McAndrew et al. | |
| 2013/0141521 | A1* | 6/2013 | Williams | H04N 5/04 |
| | | | | 348/36 |
| 2013/0251274 | A1 | 9/2013 | Xie | |
| 2015/0243324 | A1* | 8/2015 | Sandrew | G11B 27/031 |
| | | | | 386/278 |
| 2016/0277328 | A1 | 9/2016 | Ishizuka | |
| 2017/0180795 | A1* | 6/2017 | Cremer | H04N 21/47217 |
| 2018/0240276 | A1* | 8/2018 | He | G06T 3/0087 |
| 2018/0241961 | A1* | 8/2018 | Choi | H04N 7/0122 |
| 2018/0288241 | A1* | 10/2018 | Nims | B29D 11/00278 |
| 2019/0158815 | A1* | 5/2019 | He | H04N 21/4728 |
| 2019/0191203 | A1* | 6/2019 | Asbun | H04N 21/2668 |
| 2019/0230142 | A1* | 7/2019 | He | H04N 21/44218 |
| 2020/0177823 | A1* | 6/2020 | Zhu | G06K 9/00248 |
| 2020/0336718 | A1 | 10/2020 | Yoon et al. | |
| 2021/0019022 | A1* | 1/2021 | Yi | G06F 3/0481 |
| 2021/0201068 | A1* | 7/2021 | Zhang | G06K 9/6211 |
| 2021/0344928 | A1* | 11/2021 | Streater | H04N 19/521 |

FOREIGN PATENT DOCUMENTS

| | | |
|---|---|---|
| CN | 107563330 A | 1/2018 |
| CN | 109218819 A | 1/2019 |
| CN | 110784754 A | 2/2020 |
| CN | 111601139 A | 8/2020 |
| CN | 112035195 A | 12/2020 |

OTHER PUBLICATIONS

First Office Action with English translation, dated Aug. 2, 2022, in Chinese Patent Application No. 202011589037.4, 25 pages.

* cited by examiner

METHOD AND ELECTRONIC DEVICE FOR DISPLAYING VIDEO

CROSS-REFERENCE TO RELATED APPLICATIONS

This application is based on and claims priority to Chinese Patent Application No. 202011589037.4 filed on Dec. 29, 2020, the content of which is hereby incorporated by reference in its entirety into this disclosure.

FIELD

The disclosure relates to the field of image processing techniques, and more particularly, to a method, an electronic device and a storage medium for displaying a video.

BACKGROUND

Short-form videos have become a preferred medium for users to record their lives and share information. When a user is watching a short-form video, a comment panel about the short-form video may be awakened. The user may, through the comment panel, comment on the short-form video and view other users' comments on the short-form video.

SUMMARY

The disclosure provides a method, an electronic device, and a storage medium for displaying a video.

According to embodiments of the disclosure, a method for displaying a video is provided. The method includes: displaying a first video through a first video region in a display interface; obtaining display parameters of a comment region in response to an operation of triggering to display comments on the first video; zooming out the first video region to a second video region based on the display parameters of the comment region, such that the comment region is displayed in a region outside the second video region in the display interface; and displaying a second video through the second video region; in which the second video is obtained by zooming out the first video; video images in the second video includes key content of video images in the first video.

According to embodiments of the disclosure, an electronic device is provided. The electronic device includes at least one processor; and a memory communicatively coupled to the at least one processor. The memory is configured to store instructions executable by the at least one processor, and the instructions cause the at least one processor to perform any method provided in embodiments of the disclosure in response that the instructions are executed by the at least one processor.

According to embodiments of the disclosure, a non-transitory computer-readable storage medium having a computer program stored thereon is provided. The computer program is configured to cause a computer to perform any method provided in embodiments of the disclosure.

Other features and advantages of the disclosure will be given in the following descriptions, become apparent in part from the following descriptions, or be learned from the practice of the disclosure. The objectives and other advantages of the disclosure may be realized and obtained through structures pointed out in the descriptions, claims, and drawings.

BRIEF DESCRIPTION OF THE DRAWINGS

In order to clearly illustrate technical solutions of embodiments of the disclosure, a brief description of drawings used in embodiments is given below. Obviously, the drawings in the following descriptions are only part embodiments of the disclosure, and for those skilled in the art, other drawings may be obtained according to these drawings without creative labor.

DETAILED DESCRIPTION

In order to make the objectives, technical solutions, and advantages of the disclosure clearer, the disclosure will be described in detail below with reference to the drawings and embodiments. Obviously, embodiments described herein are only part of embodiments of the disclosure and are not all embodiments of the disclosure. Based on embodiments of the disclosure, other embodiments obtained by those skilled in the art without creative labor are within the scope of the disclosure.

In order to enable those skilled in the art to better understand the technical solutions of the disclosure, the technical solutions in embodiments of the disclosure will be described clearly and completely with reference to the drawings.

It should be noted that the terms such as "first" and "second" in the specification and claims of the disclosure are used to distinguish similar objects, and not necessarily used to describe a specific order or sequence. It should be understood that the data used in this way may be interchanged with each other under appropriate circumstances so that the embodiments of the disclosure described herein may be implemented in a sequence other than those illustrated or described herein. The implementation manners described in the following embodiments do not represent all implementation manners consistent with the disclosure. Rather, they are merely examples of apparatuses and methods consistent with some aspects of the disclosure as detailed in the appended claims.

The following explains some terms that appear in the description.

1. The term "and/or" in embodiments of the disclosure describes the association relationship of the associated objects, and indicates that there may be three relationships, for example, A and/or B may indicate that there are three cases where A exists separately, A and B exist at the same time, and B exists separately. The character "/" generally indicates that the contextual objects are in an "or" relationship.

2. The term "electronic device" in embodiments of the disclosure may be a mobile phone, a computer, a digital broadcasting terminal, a messaging device, a game console, a tablet device, a medical device, a fitness device, a personal digital assistant, etc.

3. The term "masking an image" in embodiments of the disclosure refers to blocking or shielding (entirely or partially) an image to be processed by a selected image, graph, or object to control a region or process of image processing. The specific image or object used for blocking or shielding may be called as a mask or template. In the digital image processing, the mask may be a two-dimensional matrix or array, and sometimes a multi-value image. The masking the image may be configured to; (1) extract a region of interest (ROI), in which a ROI mask pre-made may be multiplied with the image to be processed to obtain a ROI image, image values in the ROI image remains unchanged, but image values outside the ROI image all are 0; (2) block or shield, in which the mask is used to block or shield a region on the image so that this region may not participate in the processing or the calculation of processing parameters, or the processing or the statistics may be performed only on the blocked or shielded region; (3) extract structural features, in which structural features similar to the mask in the image may be detected and extracted using similarity variables or image matching methods.

4. The term "image dilation and erosion" in embodiments of the disclosure may be two fundamental morphological operations, which are configured to find an extremely large region and an extremely small region in the image. The dilation is similar to "field being dilated", a highlighted region or a white part of the image may be expanded, and the highlight region of the result image is greater than the highlight region of the original image. The erosion is similar to "field being eaten away", the highlighted region or the white part of the image is reduced and refined, and the highlight region of the result image is smaller than the highlight region of the original image.

5. The term "morphological opening operation" in embodiments of the disclosure firstly erodes the image and then dilates the image. The morphological opening operation maliciously eliminates small objects; separates objects at delicate places; smooths larger boundaries but may not significantly change the area.

6. The term "morphological closing operation" in embodiments of the disclosure first dilates the image and then erodes the image. The morphological closing operation may eliminate small black holes (black spots).

When a user is watching a short-form video, a comment panel may occupy a part of a screen in response that the comment panel is awakened. Therefore, a region of displaying the short-form video may become smaller. In order to display and play the short-form video completely, the short-form video may be zoomed out. After zooming out, a video screen of the short-form video may become smaller, which may affect the playing quality.

In view of this, the disclosure proposes a method, an apparatus, an electronic device, and a storage medium for displaying a video to solve the above-mentioned problems. The concept of the disclosure may be to obtain key content from a first video, and display a second video that is obtained by zooming out the first video and includes the key content of video images in the first video. It may be adapted to the video display region to display while ensuring that the key content is not missing, optimize the video display effect, and improve the user's video viewing experience under a case that the video display region is caused to change when the comment region is triggered to display.

In order to make the objectives, technical solutions, and advantages of embodiments of the disclosure clearer, the technical solutions in the embodiments of the disclosure will be described clearly and completely in conjunction with the drawings in the embodiments of the disclosure.

Figure 1:
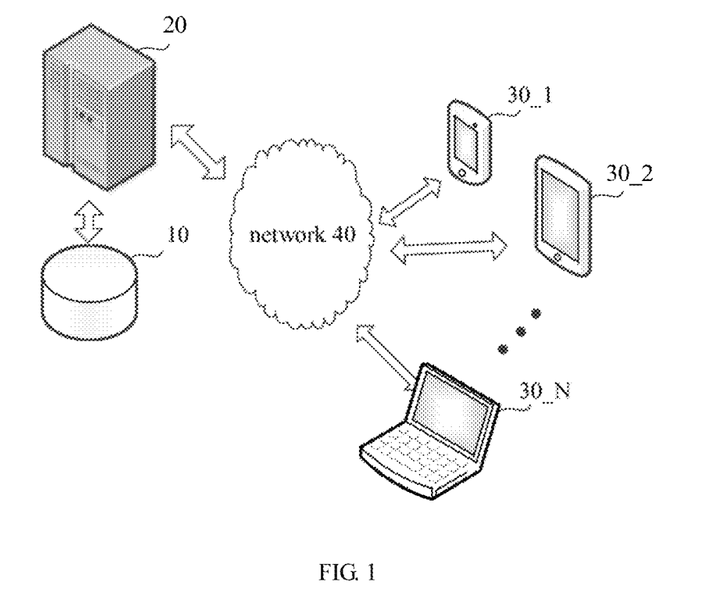
FIG. 1 is a schematic diagram illustrating an application environment according to some embodiments of the disclosure.

FIG. 1 is a schematic diagram illustrating an application environment according to some embodiments of the disclosure.

As illustrated in FIG. 1, the application environment may include, for example, a storage system 10, a server 20, and terminal devices 30 (30_1, 30_2 . . . 30_N). The terminal devices 30 may be any suitable electronic devices configured for network accessing. The terminal devices 30 may include but be not limited to computers, notebook computers, smart phones, tablet computers, or other types of terminals. The storage system 10 may store medium information that may be accessed, such as videos, images, texts. The server 20 is configured to realize interaction with the terminal devices 30, and obtain key content of videos from the storage system 20 and return it to the terminal devices 30. The terminal devices 30 may display the key content in a zoomed-out video region.

The terminal devices 30 may also communicate with each other (for example, between 30_1 and 30_2 or 30_N) via the network 40. The network 40 may be a network for information transmission in a broad sense, and may include one or more communication networks, such as a wireless communication network, Internet, a private area network, a local area network, a metropolitan area network, a wide area network, or a cellular data network.

In the description of the disclosure, a single server or a single terminal device is described in detail, but those skilled in the art should understand that the single server 20, terminal device 30, and storage system 10 illustrated are intended to indicate that technical solutions of the disclosure relate to operations of terminal devices, servers, and storage systems but may not imply limitations on the number, types, or locations of terminal devices and servers. It should be noted that when additional modules are added to the illustrated environment or individual modules are removed from the illustrated environment, underlying concepts of the embodiments of the disclosure will not be changed. In addition, although a two-way arrow from the storage system 10 to the server 20 is illustrated in FIG. 1 for the convenience of description, those skilled in the art may understand that the above-mentioned data transmission and reception may also be realized through the network 40.

Figure 2:
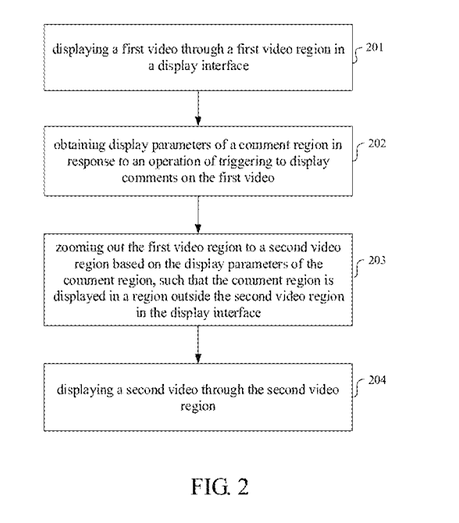
FIG. 2 is a flowchart illustrating a method for displaying a video according to some embodiments of the disclosure.

As illustrated in FIG. 2, FIG. 2 depicts a flowchart illustrating a method for displaying a video according to some embodiments of the disclosure. The method may be applied to the terminal devices 30. The method may include the following.

In 201, a first video is displayed through a first video region in a display interface.

In 202, display parameters of a comment region are obtained in response to an operation of triggering to display comments on the first video.

In 203, the first video region is zoomed out to a second video region based on the display parameters of the comment region, such that the comment region is displayed in a region outside the second video region in the display interface.

In 204, a second video is displayed through the second video region.

The second video is obtained by zooming out the first video. Video images in the second video include key content of video images in the first video.

Figure 3:
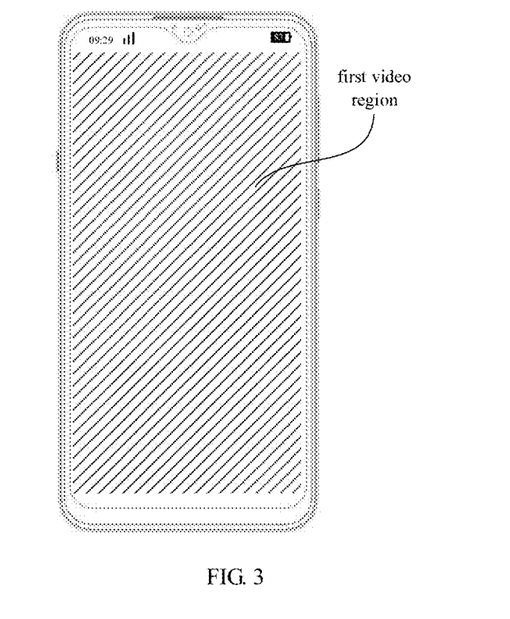
FIG. 3 is a schematic diagram illustrating a first video region according to some embodiments of the disclosure.

As illustrated in FIG. 3, FIG. 3 depicts a schematic diagram illustrating a first video region according to some embodiments of the disclosure. When the comment region is not awakened, the first video region may be a region of the display interface.

Figure 4:
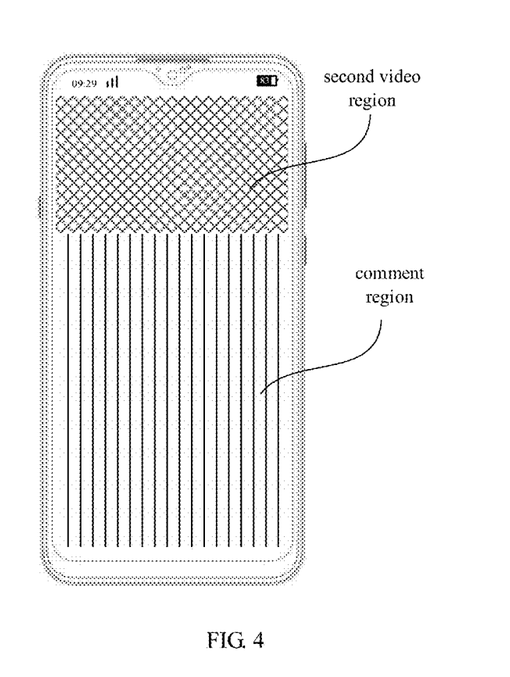
FIG. 4 is a schematic diagram illustrating a second video region and a comment region according to some embodiments of the disclosure.

As illustrated in FIG. 4, FIG. 4 depicts a schematic diagram illustrating a second video region and a comment region according to some embodiments of the disclosure. It may be seen from FIG. 4 that after the comment region is awakened, the region of the display interface may include the second video region and the comment region.

In the implementation, in conjunction with FIG. 3 and FIG. 4, it may be seen that the first video region is zoomed out to the second video region based on the display parameters of the comment region. The display parameters of the first video region may be obtained. The display parameters of the second video region may be determined based on the display parameters of the comment region and the display parameters of the first video region. The first video region is zoomed out to the second video region based on the display parameters of the second video region.

In the above method, the display parameters of the second video are determined first. The first video is zoomed out to the second video based on the display parameters of the second video. The zooming out may be performed conveniently and quickly, and the processing speed may be improved.

In detail, when determining the display parameters of the second video region, a difference between a height of the first video region and a height of the comment region may be used as a height of the second video region and a width of the first video region may be used as a width of the second video region.

Since the width of the first video region is directly used as the width of the second video region, the display parameters of the second video region may be quickly determined.

In a possible implementation manner, the height of the first video region is zoomed out to the height of the second video region. The effect of zooming out the first video region to the second video region may be realized.

Since the height is zoomed out and the width is not changed, the processing speed may be increased.

In some embodiments of the disclosure, the second video is finally displayed through the second video region. The above is an explanation of how to determine the second video region, and the following is an explanation of how to determine the second video.

In some embodiments of the disclosure, images in the second video may include key content of video images in the first video. Therefore, when determining the second video, the key content of the video images in the first video may be obtained first. The key content may be for indicating the key region included in the first video region. The first video is processed based on the key content and the display parameters of the second video region to obtain the second video.

With the second video obtained in the above-mentioned manner, it may be adapted to the second video region while ensuring that the key content of the video images in the first video is not missing, optimize the video display effect, and improve the user's video viewing experience under a case that the video display region is caused to change when the comment region is triggered to display.

The following further explains how to obtain the key content of the video images in the first video.

In implementation, multiple video images of the video images in the first video may be obtained. Candidate key content may be obtained based on gray values of the multiple video images. The key content may be determined based on pixels that satisfy a preset condition in the candidate key content.

The candidate key content may be determined and the key content may be determined from the candidate key content. Therefore, the accuracy of the key content may be improved.

In detail, when obtaining the multiple video images of the video images in the first video, the multiple video images may be extracted from the video images at equal intervals, for example, 20 images may be extracted at the equal intervals.

The multiple video images may be extracted at the equal intervals. The processing speed may be increased while making the determined key content more accurate.

For the rapid subsequent processing, after the multiple video images are extracted at the equal intervals, each image may be zoomed out to 0.4 times the original size. It should be noted that 0.4 times is only an example, and the specific multiple is not limited in the disclosure.

In some embodiments of the disclosure, when determining the candidate key content, difference information of adjacent video images in the multiple video images may be determined based on the gray values of the multiple video images. Average difference information may be determined based on multiple pieces of determined difference information. The average difference information may be performed with binarization. Content in a rectangular contour region with a largest area may be used as s the candidate key content.

In the implementation, after the multiple video images are extracted from the first video, difference masks of adjacent images in the multiple video images may be determined based on the gray values of the multiple video images. The determined multiple difference masks may be performed with the morphological opening operation to obtain the average difference mask. The average difference mask may be performed with the morphological closing operation. After performing the morphological closing operation on the average difference mask, the binarization process may be performed and the largest rectangular contour region in the binarized image may be used as the candidate key region.

When determining the difference masks of adjacent images, the mask of each image may be determined, and the difference masks of adjacent images may be determined. The difference mask of adjacent images may be the difference mask of the previous and next images. The difference mask of the previous and next images may be calculated using the adaptive mixed Gaussian background modeling method MOG2.

Figure 5:
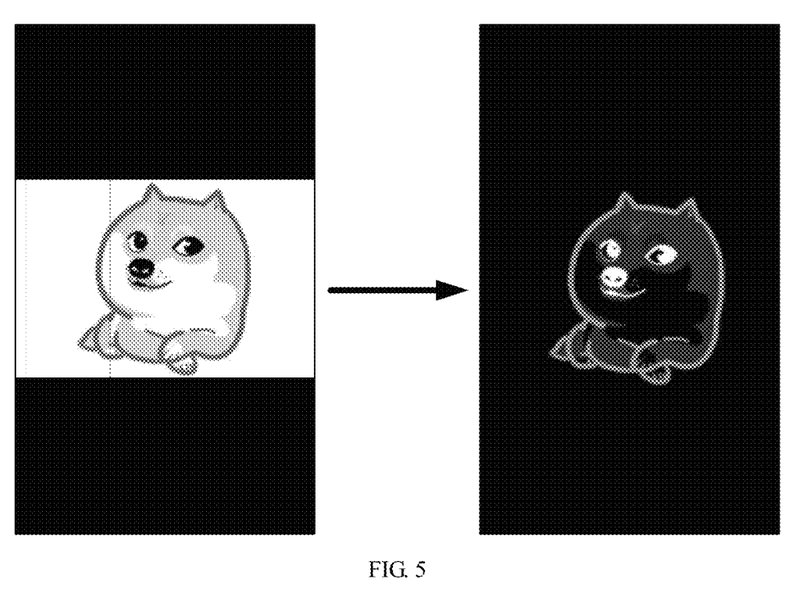
FIG. 5 is a schematic diagram illustrating masking a video image in extracted video images according to some embodiments of the disclosure.

As illustrated in FIG. 5, FIG. 5 depicts a schematic diagram illustrating masking a video image in extracted video images according to some embodiments of the disclosure.

After obtaining the difference masks of adjacent images, the morphological opening operation may be performed on each difference mask, and processed difference masks may be summed to obtain a difference mask sum. The averaging may be performed on the difference mask sum to obtain the average difference mask.

After the average difference mask is obtained, the morphological closing operation is performed on the average difference mask, and the average difference mask after the morphological closing operation is performed with the binarization.

The rectangular contour region with the largest area may be found from the difference mask after the binarization process, and the rectangular contour region with the largest area may be used as the candidate key region.

Figure 6:
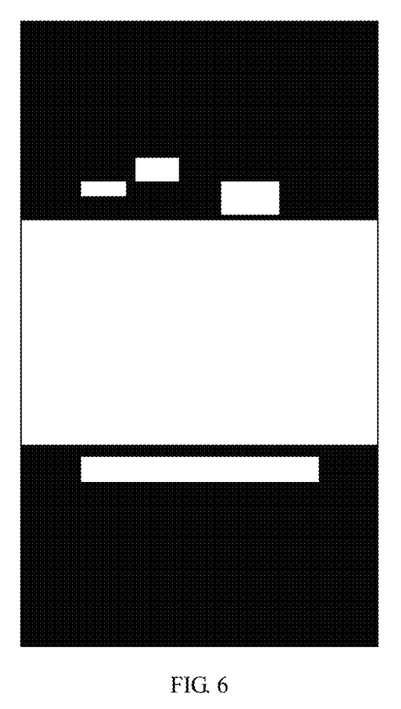
FIG. 6 is a schematic diagram illustrating a difference mask after binarization according to some embodiments of the disclosure.

As illustrated in FIG. 6, FIG. 6 depicts a schematic diagram illustrating a difference mask after binarization according to some embodiments of the disclosure. It may be seen from FIG. 6 that there are 5 rectangles in the difference mask after the binarization, that is, white rectangles in FIG. 6. It may be seen from FIG. 6 that the rectangular region with the largest area is the white rectangle in the middle.

It should be noted that in some embodiments of the disclosure, the morphological operations may include the morphological opening operation and the morphological closing operation. The morphological opening operation is to erode and then dilate the image, and the morphological closing operation is a reverse process of the morphological opening operation, i.e., to dilate the image first and then erode the image.

Erosion and dilation are for the part with large pixel values, that is, the highlight white part instead of the black part in the image.

Dilation refers to dilate the highlighted part of the image, the field is expanded, and the effect image has a larger highlight region than the original image.

Erosion refers to erode the highlight part of the image, the field is reduced, and the effect image has a smaller highlight region than the original image.

It may determine the candidate key content easily, fast and accurately when the difference information is used to determine the candidate key content.

After the candidate key content is determined, it is determined whether the candidate key content is the key content. The determining may be based on the number of pixels that satisfy the preset condition in the candidate key content.

In the implementation, a number of pixels with values greater than a first threshold in the candidate key content of the average difference mask may be determined. If the ratio of this number to the number of all pixels in the candidate key content is greater than or equal to the second threshold, the candidate key content may be used as the key content.

In some embodiments of the disclosure, the first threshold may be 128, and the second threshold may be 0.9.

For example, in the candidate key content, there are a total of 200 pixels, and there are 198 pixels with values greater than 128, and the ratio of 198 to 200 is greater than 0.9, and the candidate key content is the key content.

In some embodiments of the disclosure, after the candidate key content is determined, it is further determined whether the candidate key content is the key content, and the number of pixels in the candidate key content is used for the determination. Therefore, the accuracy of determining the key content may be further improved.

In some embodiments of the disclosure, there may be multiple pieces of candidate key content determined. The multiple pieces of candidate key content may all be the key content. A smallest bounding box capable of enclosing the rectangular contour region corresponding to each key content may be used as the key region.

Figure 7:
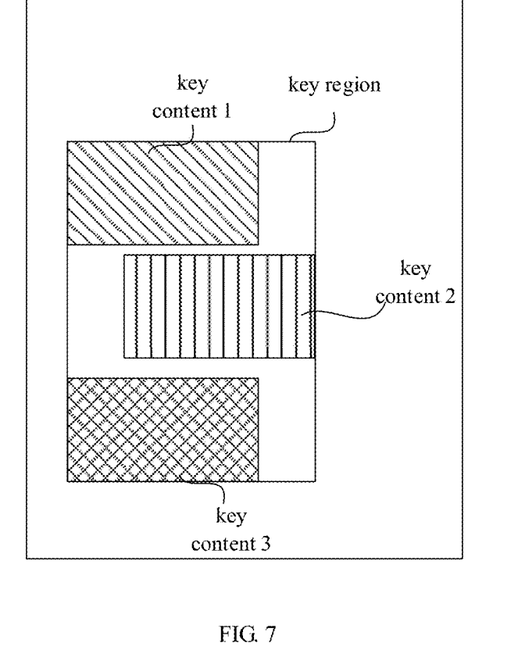
FIG. 7 is a schematic diagram illustrating multiple pieces of key content according to some embodiments of the disclosure.

For example, as illustrated in FIG. 7, FIG. 7 depicts a schematic diagram illustrating multiple pieces of key content according to some embodiments of the disclosure. It may be seen from FIG. 7 that 3 pieces of key content may be determined. The smallest bounding box of 3 rectangular counter regions is taken as the key region.

The foregoing method of determining the key region may cover the situation where multiple pieces of key content are determined. The accuracy of determining the key content may be improved.

In some embodiments of the disclosure, another method for determining the key region may be provided, which may be used when the key region is not determined by the above method for determining the key region, or the key region may be determined directly by this method.

The following describes another method of determining the key content.

First, multiple sets of rectilinear coordinate information in the multiple video images may be obtained based on the multiple video images. The key region may be determined based on a region including rectilinear coordinate information with a confidence rate greater than a third threshold.

After the key region is determined, the content in the key region may be used as the key content.

In the implementation, the multiple video images extracted from the video images in the first video may be subjected to edge detection processing, and the multiple video images after the edge detection processing may be subjected to rectilinear detection processing to obtain at least one set of rectilinear coordinate information. The region including rectilinear coordinate information with a confidence rate greater than the third threshold is used as the key region.

Figure 8:
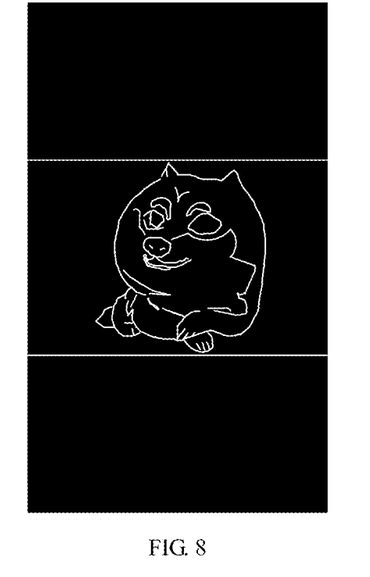
FIG. 8 is a schematic diagram illustrating a result of edge detection processing according to some embodiments of the disclosure.

As illustrated in FIG. 8, FIG. 8 depicts a schematic diagram illustrating a result of edge detection processing according to some embodiments of the disclosure. In FIG. 8, it is a result of edge detection processing on a certain video image in the video.

In some embodiments of the disclosure, rectilinear processing may be performed to perform line detection by Hough transformation. Since the boundary lines of the key region are all horizontal or vertical, the prior feature may be used to filter out the detected lines, and only the detected horizontal or vertical lines are kept.

It may be seen from FIG. 8 that two up and down lines are detected.

The rectilinear coordinate information may be used to determine the key region when the key region may not be determined using the first method, so as to improve the accuracy of determining the key region.

In some embodiments of the disclosure, the confidence rate may be determined in the following manner.

Two pieces of target coordinate information may be taken as the centers. The multiple sets of rectilinear coordinate information may be categorized to two categories based on differences between each set of rectilinear coordinate information and the two pieces of target coordinate information. For rectilinear coordinate information in any one of categories, center coordinate information of the corresponding category may be obtained by averaging the rectilinear coordinate information in the corresponding category, any rectilinear coordinate information in the corresponding category may be compared with the center coordinate information of the corresponding category to obtain a difference, and a proportion of coordinate information with an absolute value of the difference greater than or equal to a fourth threshold in the corresponding category may be used as the confidence rate of the rectilinear coordinate information.

For example, coordinates corresponding to the detected straight lines are (y1, y2, y3 . . . , yn). Since a video with upper and lower boundaries may correspond to two horizontal straight lines corresponding to the upper and lower boundaries, the corresponding coordinates of (y1, y2, y3 . . . , yn) may be performed with a KMeans clustering with a cluster number of 2, and the number of KMeans clustering iterations may be set to 10, and the coordinate information representation after clustering may be (y_up, y_bottom).

Figure 9:
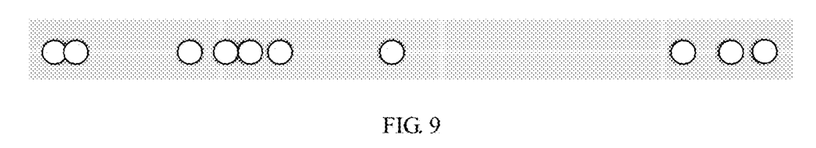
FIG. 9 is a schematic diagram illustrating one-dimensional data according to some embodiments of the disclosure.
Figure 10:
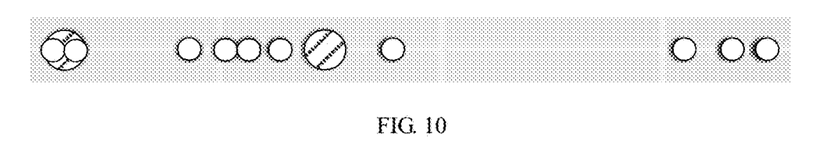
FIG. 10 is a schematic diagram illustrating two cluster centers during clustering according to some embodiments of the disclosure.

The KMeans clustering process is as follows. One-dimensional data (x1, x2 . . . , x10) may be given as illustrated in FIG. 9. The one-dimensional data (x1, x2 . . . , x10) may be clustered into 2 categories. Two cluster centers may be initialized randomly. The two shaded circles as illustrated in FIG. 10 may be two randomly initialized cluster centers (c1, c2).

Figure 11:
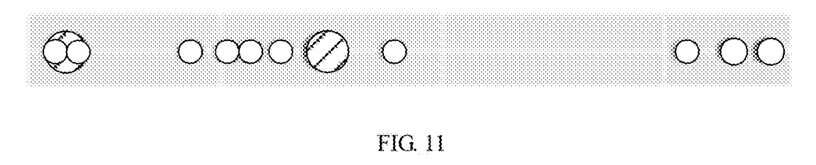
FIG. 11 is a schematic diagram illustrating a result of the first iteration according to some embodiments of the disclosure.

In the first iteration, distances from c1 to (x1, x2 . . . , x10) may be calculated and distances from c2 to (x1, x2 . . . , x10) may be calculated. For x1, since d (x1, c1)<=d (x1, c2), x1 belongs to c1. x2 to x10 may be processed as the same manner as x1 to obtain the result of the first iteration, as illustrated in FIG. 11.

Figure 12:
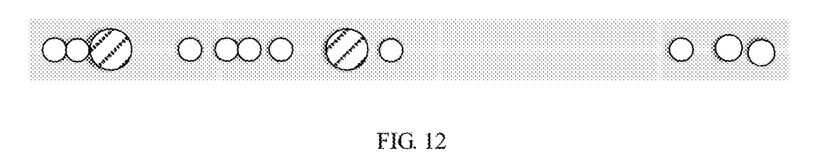
FIG. 12 is a schematic diagram illustrating locations of cluster centers after the tenth iteration according to some embodiments of the disclosure.

The cluster centers may be updated as c1=(x1+x2+x3)/3, c2=(x4+x5+x6+x7+x8+x9+x10)/7. After the first iteration, the new cluster centers move to the locations as illustrated in FIG. 12.

The subsequent iterations are the same as the first iteration. After 10 iterations, the cluster centers c1 and c2 are illustrated in FIG. 12.

After 10 iterations, the locations of c1 and c2 is the locations of the final cluster centers.

In some embodiments of the disclosure, when:
std::abs(yi−y_up)<=2, numUpCount=numUpCount+1;
std::abs(yi−y_bottom)<=2,
numBottomCount=numBottomCount+1.

The confidence rates corresponding to the detected upper and lower straight lines are upLineProb and downLineProb respectively:
upLineProb=numUpCount/20;
downLineProb=numBottomCount/20.

If (std::abs(top−y_up)<=3 and upLineProb>=0.4 and (std::abs(bottom−y_bottom<=3) and downLineProb>=0.4, and if the result satisfies this condition, the detected locations may also very incredible, so the region including straight lines that satisfy this condition may be used as the key region.

It may make the key region including the selected straight lines more accurate by using the above method to determine the confidence rate of the straight line.

In some embodiments of the disclosure, the first video is processed based on the key content and the display parameters of the second video region to obtain the second video.

In detail, under a constraint that the key region after zooming out the first video is fully displayed in the second video region, a zoom ratio of the first video may be determined based on the key content and the display parameters of the second video region. The first video may be zoomed out based on the zoom ratio to obtain the second video.

Considering that the key region after zooming out the first video may be fully displayed in the second video region as a constraint, it is possible to adapt the second video display region for display while ensuring that the key content is not missing, and optimize the video display effect and improve the user's video viewing experience.

The following describes how to determine the zoom ratio of the first video.

A first zoom ratio may be determined based on a height of the key region and a height of the second video region. A second zoom ratio may be determined based on a width of the key region and a width of the second video region. A maximum of the first zoom ratio and the second zoom ratio may be used as the zoom ratio of the first video.

The maximum value may be selected from the first zoom ratio and the second zoom ratio as the zoom ratio of the first video. Therefore, it may be ensured that the key content is completely displayed in the second video region, the video display effect may be optimized, and the user's video viewing experience may be improved.

After the zoom ratio of the first video is determined, the first video is zoomed out based on the zoom ratio to obtain the zoomed-out video, and video images in the key region in the zoomed-out video is used as the second video.

The second video obtained in the above manner may be adapted to the video display region for display while ensuring that the key content is not missing, optimize the video display effect, and improve the user's video viewing experience.

For ease of understanding, examples are used to illustrate the disclosure below.

1. When a user (User) launches an application (App), she/he may request normal video (Video) stream data from the server (Server), for example:

```
Video: {
    width:1080,
    height:1920,
    VideoDisplayLocationInfo: {
        leftRatio:0.0,
        topRatio:0.3,
        widthRatio:1.0,
        heightRatio:0.5
    }
}
``` where, width is a width of the original video, height is a height of the original video, VideoDisplayLocationInfo is the key region, leftRatio is a ratio of the left boundary of the key region to the left boundary of the display interface, topRatio is a ratio of the upper boundary of the key region to the upper boundary of the display interface, widthRatio is a ratio of the width of the key region to the width of the original video, and heightRatio is a ratio of the height of the key region to the height of the original video.

2. The video content is centered and played on the screen in the same proportion, for example:

```
Screen: {
    width:1080,
    height:1920
}
```

It should be noted that the screen herein is the video display region before zooming out.

Figure 13:
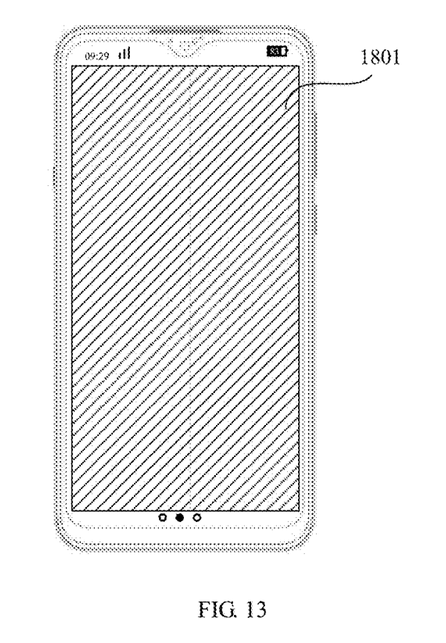
FIG. 13 is a schematic diagram illustrating a video display region before zooming out according to some embodiments of the disclosure.

As illustrated in FIG. 13, 1801 is the video display region before zooming out, that is, the width is 1080 and the height is 1920.

3. The user clicks the comment button or other buttons that may expand the comment panel to start to expand the comment panel (CommentPanel), for example:

```
CommentPanel:{
    width:1080,
    height:1536
}
```

Figure 14:
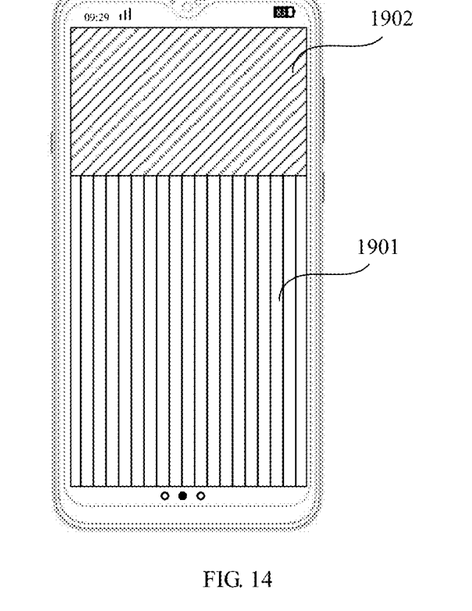
FIG. 14 is a schematic diagram illustrating a comment region according to some embodiments of the disclosure.

As illustrated in FIG. 14, 1901 is the comment panel, that is, the width is 1080 and the height is 1536 in the comment region, and 1902 is the zoomed-out display region.

4. The display region after zooming out may be calculated by the screen width and height and the fully-expanded comment panel, for example:

```
{
    left:0,
    top:0,
    width:1080,
    height:384 (1920-1536)
}
``` where, the height of the display region after zooming out is the difference between the height of the display region before zooming out and the height of the comment panel.

5. The current relative location of the content of the key region on the screen is calculated by VideoDisplayLocation-Info, and the location of the video is moved and zoomed out based on the relative location and the progress of the comment panel expansion, for example:

```
{
    left:0, (0*1080)
    top:324, (0.3*1920)
    width:1080, (1.0*1080)
    height:960 (0.5*1920)
}
``` where, the width of the original key region is 1080 and the height is 960.

Figure 15:
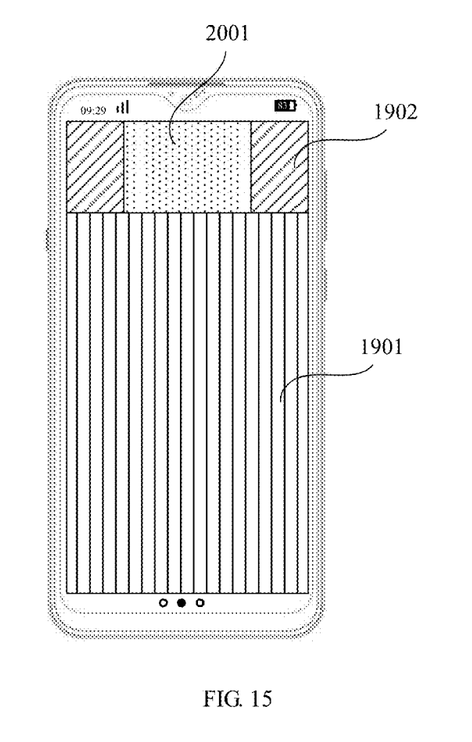
FIG. 15 is a schematic diagram illustrating a key region after zooming out according to some embodiments of the disclosure.

As illustrated in FIG. 15, FIG. 15 depicts a schematic diagram illustrating a key region after zooming out according to some embodiments of the disclosure. For the zoomed-out key region 2001 in FIG. 15, the zoomed-out key region 2001 needs to move up by 324 after employing the relative location calculated above when the comment panel is fully expanded. The zoomed-out key region 2001, compared to the key region in the original video, is zoomed out by 0.4 (384/960), that is, the width of the key region after zooming out is 432 and the height is 384.

In applications, the expansion and hiding progress of the comment panel (when the comment panel is completely expanded, it may be 1, and when the comment panel is completely hidden, it may be 0) may be monitored, and the displacement and zoom of the video display region may be adjusted dynamically, for example:

1): The comment panel expands 768;
2): The current expansion ratio of 0.5 is calculated;
3): The video is shifted upward by 162;
4): The video is zoomed out by 0.75.

The calculation of each progress is the same until it is fully expanded or completely hidden.

Figure 16:
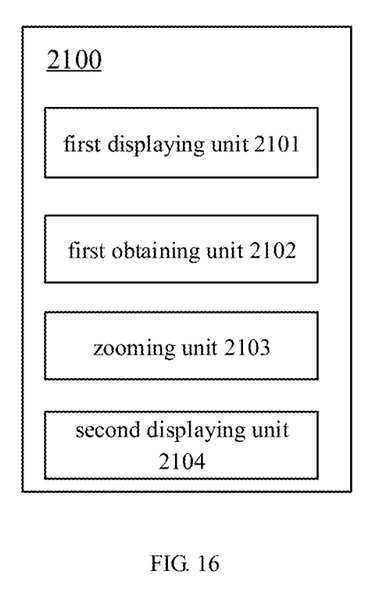
FIG. 16 is a block diagram illustrating an apparatus for displaying a video according to some embodiments of the disclosure.

As illustrated in FIG. 16, based on the same inventive concept, some embodiments of the disclosure provide an apparatus 2100 for displaying a video. The apparatus 2100 may include a first displaying unit 2101, a first obtaining unit 2102, a zooming unit 2103 and a second displaying unit 2104.

The first displaying unit 2101 is configured to display a first video through a first video region in a display interface.

The first obtaining unit 2102 is configured to obtain display parameters of a comment region in response to an operation of triggering to display comments on the first video.

The zooming unit 2103 is configured to zoom out the first video region to a second video region based on the display parameters of the comment region, such that the comment region is displayed in a region outside the second video region in the display interface.

The second displaying unit 2104 is configured to display a second video through the second video region; in which the second video is obtained by zooming out the first video; video images in the second video includes key content of video images in the first video.

In some embodiments, the zooming unit is configured to: obtain display parameters of the first video region; determine display parameters of the second video region based on the display parameters of the first video region and the display parameters of the comment region; and zoom out the first video region to the second video region based on the display parameters of the second video region.

In some embodiments, the zooming unit is configured to: use a difference between a height of the first video region and a height of the comment region as a height of the second video region; and use a width of the first video region as a width of the second video region.

In some embodiments, the zooming unit is configured to: zoom out the height of the first video region to the height of the second video region.

In some embodiments, the apparatus further includes: a second obtaining unit configured to obtain the key content of the video images in the first video, the key content for indicating a key region in the first video region; and a processing unit configured to obtain the second video by processing the first video based on the key content and the display parameters of the second video region.

In some embodiments, the processing unit is configured to: determine a zoom ratio of the first video based on the key content and the display parameters of the second video region under a constraint that the key region after zooming out the first video is fully displayed in the second video region; and obtain the second video by zooming out the first video based on the zoom ratio.

In some embodiments, the processing unit is configured to: determine a first zoom ratio based on a height of the key region and a height of the second video region; determine a second zoom ratio based on a width of the key region and a width of the second video region; and use a maximum of the first zoom ratio and the second zoom ratio as the zoom ratio of the first video.

In some embodiments, the processing unit is configured to: obtain a zoomed-out video by zooming out the first video based on the zoom ratio; and use video images in the key region in the zoomed-out video as the second video.

In some embodiments, the apparatus further includes: a third obtaining unit configured to obtain multiple video images in the first video; a first determining unit configured to obtain candidate key content based on gray values of the multiple video images; and a second determining unit configured to determine the key content based on pixels satisfying a preset condition in the candidate key content.

In some embodiments, the third obtaining unit is configured to: extract the multiple video images from the video images in the first video at equal intervals.

In some embodiments, the first determining unit is configured to: determine difference information of adjacent video images in the multiple video images based on the gray values of the multiple video images; determine average difference information based on multiple pieces of determined difference information; and use content in a rectangular contour region with a largest area as the candidate key content after binarizing the average difference information.

In some embodiments, the first determining unit is configured to: determine a number of pixels with values greater than a first threshold in the candidate key content; and use the candidate key content as the key content in response that a ratio of the number to a number of all pixels in the candidate key content is greater than or equal to a second threshold.

In some embodiments, the first determining unit is configured to use a smallest bounding box capable of enclosing a rectangular contour region corresponding to each key content as the key region under a case that multiple pieces of key content are included.

In some embodiments, the apparatus further includes: a third determining unit configured to obtain multiple sets of rectilinear coordinate information in the multiple video images based on the multiple video images; and determine the key region based on a region including rectilinear coordinate information with a confidence rate greater than a third threshold.

In some embodiments, the third determining unit is configured to determine the confidence rate in the following manner of: categorizing the multiple sets of rectilinear coordinate information to two categories based on differences between each set of rectilinear coordinate information and two pieces of target coordinate information, the two pieces of target coordinate information being centers; for rectilinear coordinate information in any one of categories, obtaining center coordinate information of the corresponding category by averaging the rectilinear coordinate information in the corresponding category; comparing any rectilinear coordinate information in the corresponding category with the center coordinate information of the corresponding category to obtain a difference; and using a proportion of coordinate information with an absolute value of the difference greater than or equal to a fourth threshold in the corresponding category as the confidence rate of the rectilinear coordinate information.

The electronic device 130 according to some embodiments of the disclosure may be described below with reference to FIG. 17. The electronic device 130 illustrated in FIG. 17 is an example, and should not bring any limitation to the functions and scope of the embodiments of the disclosure.

Figure 17:
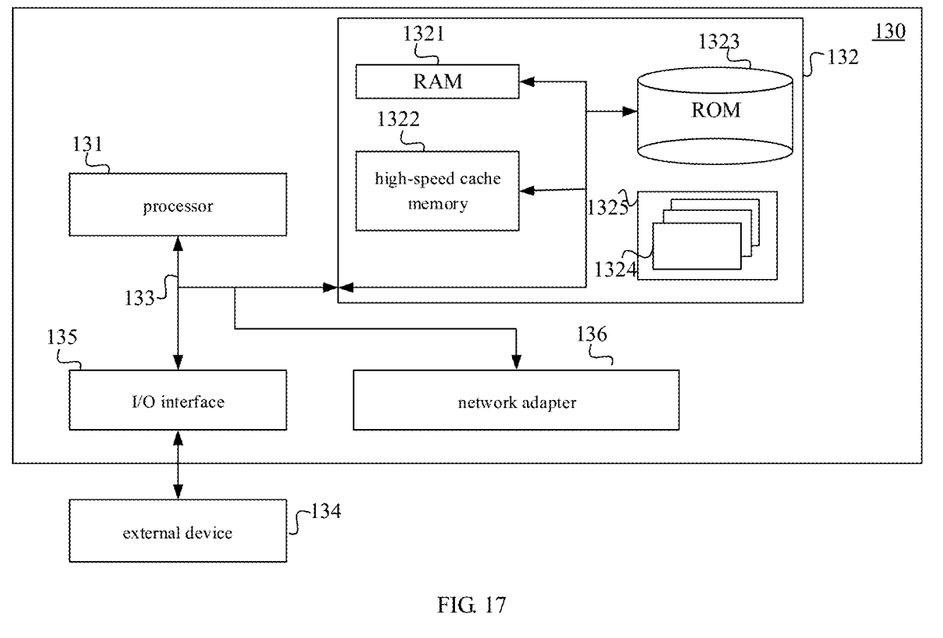
FIG. 17 is a schematic diagram illustrating an electronic device according to some embodiments of the disclosure.

As illustrated in FIG. 17, the electronic device 130 is represented in form of general-purpose electronic device. Components of the electronic device 130 may include, but be not limited to: the at least one processor 131, the at least one memory 132, and a bus 133 connecting different system components (including the memory 132 and the processor 131).

The bus 133 represents one or more of several types of bus structures, including a memory bus or a memory controller, a peripheral bus, a processor, or a local bus using any of a variety of bus structures.

The memory 132 may include a readable medium in form of volatile memory, such as a random-access memory (RAM) 1321 and/or a high-speed cache memory 1322, and may further include a read-only memory (ROM) 1323.

The memory 132 may also include a program/utility tool 1325 having a set of (at least one) program modules 1324. Such program modules 1324 may include but be not limited to: an operating system, one or more application programs, other program modules, and program data. Each of the examples or some combination of the examples may include the realization of the network environment.

The electronic device 130 may also communicate with one or more external devices 134 (such as, a keyboard, a pointing device, etc.). Furthermore, the electronic device 130 may also communicate with one or more communication devices enabling a user to interact with the electronic device 130 and/or other devices (such as a network card, modem, etc.) enabling the electronic device 1300 to communicate with one or more computer devices. This communication may be performed via the input/output (I/O) interface 135. Also, the electronic device 130 may communicate with one or more networks (such as a local area network (hereafter referred to as LAN), a wide area network (hereafter referred to as WAN) and/or a public network such as an Internet) through a network adapter 136. As illustrated in FIG. 17, the network adapter 136 communicates with other modules of the electronic device 130 over the bus 133. It should be understood that, although not illustrated in FIG. 17, other hardware and/or software modules may be used in connection with the electronic device 130. The hardware and/or software includes, but is not limited to, microcode, device drivers, redundant processors, external disk drive arrays, RAID (Redundant Array of Independent Disks) systems, tap Drives, and data backup storage systems.

In some possible implementation manners, various aspects of the method for displaying the video provided in the disclosure may also be implemented in form of program product including program codes. When the program product runs on a computer device, the program codes may make the computer device execute the actions in the method for displaying the video according to various embodiments of the disclosure described above.

The program product may adopt any combination of one or more readable media. The readable media may be readable signal media or readable storage media. The readable storage media may be, for example, but be not limited to, electrical, magnetic, optical, electromagnetic, infrared, or semiconductor systems, apparatuses, or devices, or a combination thereof. More specific examples (non-exhaustive list) of the readable storage media may include: electrical connections with one or more wires, portable disks, hard disks, random-access memory (RAM), read-only memory (ROM), erasable programmable read-only memory (EPROM or flash memory), optical fibers, compact disc read-only memory (CD-ROM), optical storage devices, magnetic storage devices, or any suitable combination thereof.

The program product provided in the embodiments of the disclosure may adopt a compact disc read-only memory (CD-ROM) and include program codes, and may be run on an electronic device. However, the program product of the disclosure is not limited thereto. In the disclosure, the readable storage medium may be any tangible medium that contains or stores programs, and the programs may be used by or in combination with an instruction execution system, apparatus, or device.

The readable signal media may include data signals propagated in baseband or as a part of carriers, which may carry readable program codes therein. The propagated data signals may employ many forms, including, but being not limited to, electromagnetic signals, optical signals, or any suitable combination thereof. The readable signal media may also be any readable media other than the readable storage media, and the readable media may send, propagate, or transmit programs used by or in combination with the instruction execution system, apparatus, or device.

The program codes contained on the readable media may be transmitted by any suitable media, including, but being not limited to, wireless, wired, optical cable, RF (radio frequency), etc., or any suitable combination thereof.

The program codes for performing operations of the disclosure may be written in any combination of one or more programming languages. The programming languages include object-oriented programming languages such as Java, C++, as well as conventional procedural programming language such as "C" language or similar programming language. The program codes may be executed entirely on the user electronic device, executed partly on the user electronic device, executed as an independent software package, executed partly on the user electronic device and partly on the remote electronic device, or executed entirely on the remote electronic device or service. In the case of the remote electronic device, the remote electronic device may be connected to the user electronic device through any kind of networks including a local area network (LAN) or a wide area network (WAN), or connected to an external electronic device (for example, connected through Internet of the connected service provider).

It should be noted that although several units or subunits of the apparatus are mentioned in the above detailed description, this division is only exemplary and not mandatory. In fact, according to the embodiments of the disclosure, features and functions of two or more units described above may be embodied in one unit. Conversely, features and functions of one unit described above may be further divided into multiple units.

In addition, although the operations of the method of the disclosure are described in a specific order in the drawings, this does not require or imply that these operations must be performed in the specific order, or that all the operations shown must be performed to achieve the desired result. Additionally, or alternatively, some actions may be omitted, multiple actions may be combined into one action for execution, and/or one action be decomposed into multiple actions for execution.

Those skilled in the art should understand that the embodiments of the disclosure may be provided as methods, systems, or computer program products. Therefore, the disclosure may adopt the form of complete hardware embodiment, complete software embodiment, or embodiment combining software and hardware. Moreover, the disclosure may also adopt the form of computer program product implemented on one or more computer-usable storage media (such as disk storage, CD-ROM, optical storage, etc.) containing computer-usable program codes.

The disclosure is described with reference to flowcharts and/or block diagrams of methods, apparatus (systems), and computer program products according to embodiments of the disclosure. It should be understood that each process and/or block in the flowcharts and/or block diagrams, and the combination of processes and/or blocks in the flowcharts and/or block diagrams may be implemented by computer program instructions. These computer program instructions may be provided to a general-purpose computer, a special-purpose computer, an embedded processor, or a processor of other programmable image zooming equipment to generate a machine, so that the instructions executed by the computer or the processor of other programmable image zooming equipment may generate a device that implements functions specified in one process or multiple processes in the flowcharts and/or one block or multiple blocks in the block diagrams.

These computer program instructions may also be stored in a computer-readable memory that may guide a computer or other programmable image zooming equipment to work in a specific manner, so that the instructions stored in the computer-readable memory produce an article of manufacture including the instruction device. The instruction device implements functions specified in one process or multiple processes in the flowcharts and/or one block or multiple blocks in the block diagram.

These computer program instructions may also be loaded on a computer or other programmable image zooming equipment, so that a series of operations are executed on the computer or other programmable equipment to produce computer-implemented processing. Therefore, the instructions executed on the computer or other programmable equipment may provide actions for implementing functions specified in one process or multiple processes in the flowcharts and/or one block or multiple blocks in the block diagram.

Although the embodiments of the disclosure have been described, those skilled in the art may make additional changes and modifications to these embodiments once they learn the basic creative concepts. Therefore, the appended claims are intended to be interpreted as including the embodiments and all changes and modifications falling within the scope of the disclosure.

Obviously, those skilled in the art may make various changes and modifications to the disclosure without departing from the spirit and scope of the disclosure. In this way, if these modifications and changes of the disclosure fall within the scope of the claims of the disclosure and their equivalent technologies, the disclosure is also intended to include these modifications and changes.

What is claimed is:

1. A method for displaying a video, comprising:
displaying a first video through a first video region in a display interface;
obtaining display parameters of a comment region in response to an operation of triggering to display comments on the first video;
zooming out the first video region to a second video region based on the display parameters of the comment region, such that the comment region is displayed in a region outside the second video region in the display interface; and displaying a second video through the second video region;

wherein, the second video is obtained by zooming out the first video; video images in the second video comprise key content of video images in the first video, wherein the method further comprises:

obtaining multiple video images in the first video;

obtaining candidate key content based on gray values of the multiple video images; and determining the key content based on pixels satisfying a preset condition in the candidate key content, wherein obtaining the candidate key content based on the gray values of the multiple video images comprises:

determining difference information of adjacent video images in the multiple video images based on the gray values of the multiple video images; and obtaining the candidate key content based on the difference information.

2. The method as claimed in claim 1, wherein zooming out the first video region to the second video region based on the display parameters of the comment region comprises:

obtaining display parameters of the first video region;

determining display parameters of the second video region based on the display parameters of the first video region and the display parameters of the comment region; and zooming out the first video region to the second video region based on the display parameters of the second video region.

3. The method as claimed in claim 2, further comprising:

determining a height of the second video region based on a difference between a height of the first video region and a height of the comment region; and determining a width of the second video region based on a width of the first video region.

4. The method as claimed in claim 3, wherein zooming out the first video region to the second video region based on the display parameters of the comment region comprises:

zooming out the height of the first video region to the height of the second video region.

5. The method as claimed in claim 2, further comprising:

obtaining the key content of the video images in the first video, the key content for indicating a key region comprised in the first video region; and obtaining the second video by processing the first video based on the key content and the display parameters of the second video region.

6. The method as claimed in claim 5, wherein obtaining the second video by processing the first video based on the key content and the display parameters of the second video region comprises:

determining a zoom ratio of the first video based on the key content and the display parameters of the second video region; and obtaining the second video by zooming out the first video based on the zoom ratio.

7. The method as claimed in claim 6, wherein determining the zoom ratio of the first video based on the key content and the display parameters of the second video region comprises:

determining a first zoom ratio based on a height of the key region and a height of the second video region;

determining a second zoom ratio based on a width of the key region and a width of the second video region; and determining the zoom ratio of the first video based on a maximum of the first zoom ratio and the second zoom ratio.

8. The method as claimed in claim 6, wherein obtaining the second video by zooming out the first video based on the zoom ratio comprises:

obtaining a zoomed-out video by zooming out the first video based on the zoom ratio; and determining the second video based on video images in the key region in the zoomed-out video.

9. The method as claimed in claim 1, wherein obtaining the multiple video images in the first video comprises:

extracting the multiple video images from the video images in the first video at equal intervals.

10. The method as claimed in claim 9, wherein obtaining the candidate key content based on the difference information comprises:

determining difference information of adjacent video images in the multiple video images based on the gray values of the multiple video images;

determining average difference information based on multiple pieces of determined difference information; and determining the candidate key content based on content in a rectangular contour region with a largest area after binarizing the average difference information.

11. The method as claimed in claim 10, wherein the determining the key content based on the pixels satisfying the preset condition in the candidate key content comprises:

determining a number of pixels with values greater than a first threshold in the candidate key content; and determining the key content based on the candidate key content in response that a ratio of the number to a number of all pixels in the candidate key content is greater than or equal to a second threshold.

12. The method as claimed in claim 11, further comprising:

determining the key region based on a smallest bounding box capable of enclosing a rectangular contour region corresponding to each key content under a case that multiple pieces of key content are comprised.

13. The method as claimed in claim 1, further comprising:

obtaining multiple sets of rectilinear coordinate information in the multiple video images based on the multiple video images; and determining the key region based on a region including rectilinear coordinate information with a confidence rate greater than a third threshold.

14. The method as claimed in claim 13, wherein the confidence rate is determined in the following manner of:

categorizing the multiple sets of rectilinear coordinate information to two categories based on differences between each set of rectilinear coordinate information and two pieces of target coordinate information, the two pieces of target coordinate information being centers;

for rectilinear coordinate information in any one of categories, obtaining center coordinate information of the corresponding category by averaging the rectilinear coordinate information in the corresponding category;

comparing any rectilinear coordinate information in the corresponding category with the center coordinate information of the corresponding category to obtain a difference; and determining the confidence rate of the rectilinear coordinate information based on a proportion of coordinate information with an absolute value of the difference greater than or equal to a fourth threshold in the corresponding category.

15. An electronic device, comprising:
at least one processor; and
a memory communicatively coupled to the at least one processor;
wherein the memory is configured to store instructions executable by the at least one processor, and the instructions, in response that the instructions are executed by the at least one processor, cause the at least one processor to:
display a first video through a first video region in a display interface;
obtain display parameters of a comment region in response to an operation of triggering to display comments on the first video;
zoom out the first video region to a second video region based on the display parameters of the comment region, such that the comment region is displayed in a region outside the second video region in the display interface; and
display a second video through the second video region;
wherein, the second video is obtained by zooming out the first video; video images in the second video comprise key content of video images in the first video,
wherein the memory is further configured to store instructions executable by the at least one processor, and the instructions, in response that the instructions are executed by the at least one processor, cause the at least one processor to:
obtain multiple video images in the first video;
obtain candidate key content based on gray values of the multiple video images; and
determine the key content based on pixels satisfying a preset condition in the candidate key content,
wherein the memory is further configured to store instructions executable by the at least one processor, and the instructions, in response that the instructions are executed by the at least one processor, cause the at least one processor to:
determine difference information of adjacent video images in the multiple video images based on the gray values of the multiple video images; and
obtain the candidate key content based on the difference information.

16. The electronic device as claimed in claim 15, wherein the instructions, in response that the instructions are executed by the at least one processor, cause the at least one processor to:
obtain display parameters of the first video region;
determine display parameters of the second video region based on the display parameters of the first video region and the display parameters of the comment region; and
zoom out the first video region to the second video region based on the display parameters of the second video region.

17. The electronic device as claimed in claim 16, wherein the instructions, in response that the instructions are executed by the at least one processor, cause the at least one processor to:
determine a height of the second video region based on a difference between a height of the first video region and a height of the comment region; and
determine a width of the second video region based on a width of the first video region.

18. The electronic device as claimed in claim 17, wherein the instructions, in response that the instructions are executed by the at least one processor, cause the at least one processor to:
zoom out the height of the first video region to the height of the second video region.

19. A non-transitory computer-readable storage medium having stored therein instructions that, when executed by a processor of an electronic device, causes the electronic device to perform:
displaying a first video through a first video region in a display interface;
obtaining display parameters of a comment region in response to an operation of triggering to display comments on the first video;
zooming out the first video region to a second video region based on the display parameters of the comment region, such that the comment region is displayed in a region outside the second video region in the display interface; and
displaying a second video through the second video region;
wherein, the second video is obtained by zooming out the first video; video images in the second video comprise key content of video images in the first video,
wherein the instructions, when executed by the processor of the electronic device, further causes the electronic device to perform:
obtaining multiple video images in the first video;
obtaining candidate key content based on gray values of the multiple video images; and
determining the key content based on pixels satisfying a preset condition in the candidate key content,
wherein obtaining the candidate key content based on the gray values of the multiple video images comprises:
determining difference information of adjacent video images in the multiple video images based on the gray values of the multiple video images; and
obtaining the candidate key content based on the difference information.

* * * * *